Figures 1, 2:
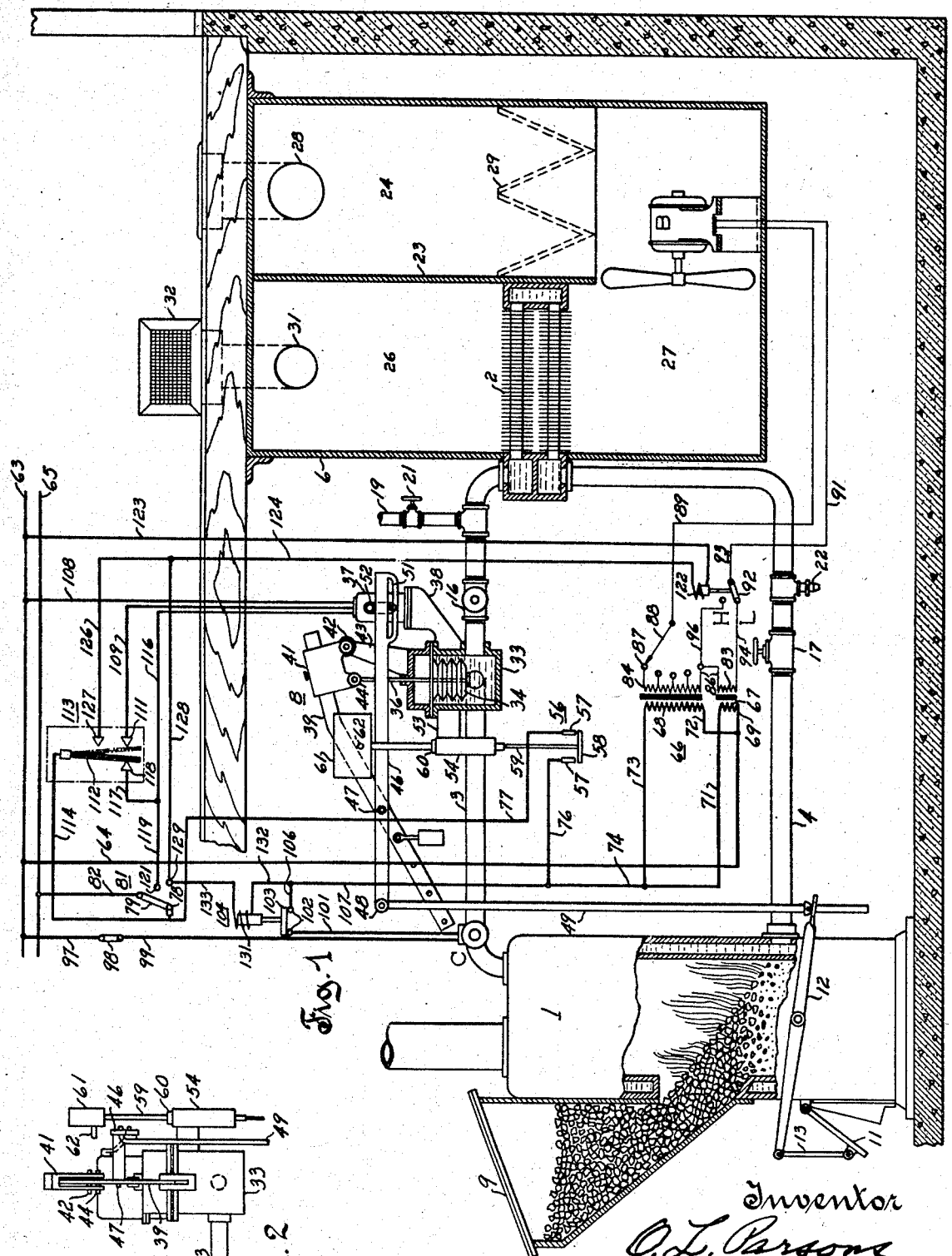

Dec. 23, 1941.  O. L. PARSONS  2,267,165
HEATER CONTROL SYSTEM
Filed Oct. 28, 1939

Inventor
O. L. Parsons
by
Attorney

Patented Dec. 23, 1941

2,267,165

UNITED STATES PATENT OFFICE 2,267,165

HEATER CONTROL SYSTEM

Oliver L. Parsons, Wauwatosa, Wis., assignor to Allis-Chalmers Manufacturing Company, Milwaukee, Wis., a corporation of Delaware Application October 28, 1939, Serial No. 301,723

7 Claims. (Cl. 236—9)

This invention relates generally to heating systems and more particularly to the control of heating systems to effect a more uniform temperature in the space or spaces to be heated. This invention is an improvement with respect to that disclosed and claimed in applicant's copending application Serial No. 232,710, filed October 1, 1938.

The known systems for accomplishing this result comprise a heat generator having means for varying the rate of heat generation to maintain the temperature of the heat generator or of a fluid heated therein within predetermined limits, means for conducting a heating medium in heat exchanging relation with respect to the heat generator or with respect to the fluid heated therein and to the space or spaces to be heated, and means including a space temperature responsive device for effecting a delivery or an accelerated delivery of the heating medium to the space or spaces to be heated whenever the temperature of the heat generator or of the fluid heated therein is above a predetermined value and the temperature of the space or spaces to be heated is less than a predetermined minimum. However, the operation of these systems has not proven entirely satisfactory because of appreciable variations in the temperature of the space or spaces heated thereby.

A space to be satisfactorily heated must be supplied with heat (the heating medium) at a rate which is at least equal to or slightly greater than the rate of heat dissipation from said space. The rate of heat dissipation necessarily varies with weather conditions and the known practice is to supply the heat at the rate which is necessary to satisfactorily heat the space under the most adverse conditions. Consequently, the means for effecting a delivery or an accelerated delivery of the heating medium is always operated at a constant speed whenever there is a demand for heat in the space to be heated and as a result the heating medium is delivered at a substantially constant rate, which is sufficient to heat the space under the most adverse conditions, until the temperature of the space to be heated reaches the value at which the space temperature responsive device operates to terminate the delivery or the accelerated delivery of the heating medium.

The rate at which a space temperature responsive device absorbs or dissipates heat is a function of the temperature difference between the device and the surrounding medium. Consequently, the heat capacity of the space temperature responsive device and the rapidity with which an appreciable temperature difference is established determine the time required for the device to effect an operation of the mechanism controlled thereby. The heat capacity of these devices has been materially reduced in an effort to decrease the time of operation to a negligible value, but in the known types of systems in which an operation of the heating medium delivery means effects a rapid increase in the temperature of the space being heated the commercially satisfactory devices now available generally require an increase in the space temperature of as much as three of four degrees Fahrenheit above that for which the device is set in order to terminate the delivery of the heating medium and then a decrease in the space temperature to a value about two degrees Fahrenheit below the said setting in order to again effect a delivery of the heating medium. The difference in the necessary degree of temperature change usually experienced with respect to the temperature of the space being heated is due to the fact that the rate of temperature increase is generally greater than the rate of temperature decrease. The rate of heat dissipation from the space being heated will of course alter to some extent the above specified values of temperature change.

This mode of operation subjects the occupants of the space being heated to a continuously changing temperature which at frequent intervals reaches maximum and minimum values several degrees above and below the desired temperature. Moreover, the delivery of the heating medium at a substantially constant rate commensurate with the rate of heat dissipation under the most adverse heating conditions frequently causes the degree of temperature variation to materially exceed that contemplated due to the combined effects of a high rate of heat transfer and of combustion lag. The high rate of heat transfer, which is caused by a rapid circulation of the heating medium, causes the temperature of the heat generator or of the fluid heated thereby to decrease rapidly. Therefore, whenever there is a demand for heat and the temperature of the heat generator or of the fluid heated thereby is only a little above the predetermined minimum value, combustion lag, which is particularly noticeable in a solid fuel burning heat generator, permits the temperature of the heat generator or of the fluid heated thereby to rapidly fall below the predetermined minimum value and terminate operation of the means effecting a delivery or an accelerated delivery of the heating medium. Consequently, the temperature of the space being heated continues to decrease for a further time interval which in many instances is sufficient to effect a temperature decrease of as much as eight degrees Fahrenheit below the desired value.

This invention contemplates preventing the temperature of the space being heated from rising an appreciable amount above the desired value by subjecting the temperature responsive device to a temperature slightly above the desired value for a sufficient time interval to render said device operative to terminate operation of the heating medium delivery means. This result is accomplished by effecting a decrease in the rate of delivery of the heating medium whenever the temperature of the space being heated nears the desired value which prevents the temperature of the space being heated from rapidly increasing above the desired value. Consequently, only a slight increase in temperature above the desired value renders the space temperature device operable to terminate the delivery or the accelerated delivery of the heating medium. This invention also contemplates preventing the temperature of the space being heated from decreasing an appreciable amount below the desired value by effecting a delivery or an accelerated delivery of the heating medium at a reduced rate whenever there is a demand for heat as indicated by a decrease in the temperature of the space being heated to a value slightly below the desired temperature and continuing to deliver the heating medium at the reduced rate until the temperature of the space either reaches the desired value and the delivery or the accelerated delivery of the heating medium is terminated or the temperature decreases to a lower value which again effects a material increase in rate at which the heating medium is delivered. This latter procedure negatives the effects of combustion lag and prevents the temperature of the heat generator or of the fluid heated thereby from decreasing to a value below the predetermined minimum which in turn prevents a termination of the delivery or of the accelerated delivery of the heating medium and a further decrease in the temperature of the space being heated.

It is therefore an object of this invention to provide an improved mode of operation for a heating system which will prevent rapid and material fluctuations of the space temperature and which will maintain the space temperature within relatively narrow limits.

Another object of this invention is to provide an improved control system which is capable of effecting the improved mode of operation specified above.

Still another object of this invention is to provide an improved control system for a heating and cooling system.

Still another object of this invention is to provide an improved control system for effecting a decrease in the rate at which the heating medium is being delivered to a space to be heated whenever the temperature of the space approaches the desired value.

Still another object of this invention is to provide an improved control system operable to effect a delivery or an accelerated delivery of the heating medium at a reduced rate whenever the space temperature is slightly below the desired value and to continue to deliver the heating medium at the reduced rate until the temperature of the space either reaches the desired value whereupon the delivery of the heating medium is terminated or further decreases in which event, the heating medium is then delivered at a higher rate.

The invention accordingly consists of the various modes of operation, features of construction, combination of elements and arrangements of parts as more fully pointed out in the appended claims and in the detailed description in which:

Fig. 1 schematically illustrates a solid fuel burning hot air heating system embodying the invention;

Fig. 2 is a partial end elevation of the control mechanism shown in Fig. 1.

Referring to Fig. 1 it is seen that the heating system schematically illustrated thereby comprises a hot water heater or boiler 1, a heat exchanger or radiator 2 which is connected in circulatory relation with the water jacket of boiler 1 by means of pipes 3 and 4, a cabinet 6 enclosing the radiator 2 and arranged to receive cooled air from the space to be heated and to deliver heated air thereto, a motor driven blower unit B for accelerating the delivery of the heating medium and a control mechanism designated generally by the numeral 8 for controlling the temperature of the space to be heated and the temperature of the fluid circulated through radiator 2.

The boiler 1 which is of the solid fuel type includes the usual grate structure (not shown), a closed fuel hopper 9 arranged for the gravity feed of fuel to the grate at a rate commensurate with the rate of fuel consumption and a draft door 11 operated by means of a pivoted lever 12 and a link 13 for varying the rate of combustion and heat generation. The pipes 3 and 4 are connected to the upper and lower portions respectively of the boiler water jacket to produce gravity circulation of the water through the radiator and boiler, and in this connection it may be advisable to employ a motor operated control valve or circulating pump C for controlling and/or obtaining a more positive circulation of the heating fluid through the radiator 2 and boiler 1. Pipes 3 and 4 are also provided with shutoff valves 16 and 17 respectively for shutting off the flow of the heating fluid to the radiator 2 whenever it is desired to use the radiator for cooling purposes. A pipe 19 representing a source of cooling fluid such as the city water supply and containing a control valve 21 is connected to pipe 3, and pipe 4 is provided with a drain cock 22 so that when the valves 16 and 17 are closed and the valve 21 and the drain cock 22 are opened, cooling fluid will flow through the radiator 2.

The cabinet or casing 6 includes a depending partition member 23 which terminates in the lower portion of the casing and divides the interior of the casing into an air receiving and filtering chamber 24, an air heating chamber 26 and a blower chamber 27. One or more pipes 28 connect the upper portion of chamber 24 with the space or spaces to be heated. A filter 29 of any desired construction extends entirely across the bottom portion of chamber 24 whereby air entering the chamber through pipe 28 must pass through the filter 29 before entering the blower chamber. A pipe 31 connects the upper portion of the chamber 26 with the space to be heated by means of the register 32 and the radiator 2 extends entirely across the lower portion of this chamber whereby air entering chamber 26 from the blower chamber 27 passes in heat exchanging relation with respect to the radiator 2. The blower when operating withdraws relatively cool air from the space to be heated through pipe 28, chamber 24, filter 29, and into the blower chamber from which the air is forced upwardly through the radiator 2, chamber 26, pipe 31, register 32, and into the space to be heated. When the blower is not operating, the previously described circulation of the air is maintained at a reduced rate due to thermosyphon action, and although this mode of operation is generally preferred, it may be desirable to employ a blower construction operable to prevent thermosyphon circulation of the air when the blower is not operating.

The control mechanism 8, reference also being had to Fig. 2, comprises a temperature responsive device including a casing 33, the interior of which is in communication with the pipe 3 and contains a temperature responsive device such as the Sylphon bellows 34 having an actuating stem 36 extending upwardly through the casing for connection with apparatus to be actuated thereby, and a conventional 180° electric motor 37 which is supported on a fixed bracket 38 carried by the casing 33. A counterweighted lever 39 is adjustably mounted in a connector 41 which has a pivotal connection 42 adjacent one end with a fixed bracket 43 carried by the casing 33. Connector 41 also has a pivotal connection 44 adjacent its other end with the stem 36 of bellows 34. A lever 46 is pivotally connected intermediate its ends at 47 with the lever 39 and has adjacent one end a pivotal connection 48 with one end of a damper rod 49 and adjacent its other end a sliding and pivotal connection 51 with the crank arm 52 of the motor 37. The lower end of the damper rod 49 is provided with a lost motion connection with the damper operating lever 12. The described lever arrangement is such that a rotation of the crank arm 52 will cause the lever 46 to turn about its point of pivotal connection with the lever 39 and effect either an opening or closing movement, depending upon the initial position of the motor crank arm 52, of the draft damper 11. The bellows 34 expands and contracts in accordance with changes in temperature of the fluid flowing in the pipe 3 and casing 33 and actuates the lever 39 to turn about its point of pivotal connection with the bracket 43. The pivotal connection 47 between the levers 39, 46 constitutes an adjustable fulcrum for the lever 46, the position of which is determined by the temperature of the fluid in the casing 33 and the corresponding position of lever 39.

A bracket 53 extends laterally from the casing 33 and carries an elongated guide member 54. A switch 56 comprising a pair of stationary contacts 57 and a bridging member 58 which is actuated by means of elongated stem 59 which is secured to the bridging member 58 and extends upwardly through the guide member 54 to a point above the lever 46. A weight 61 is disposed on the upper end of the stem 59 and an intermediate portion of stem 59 is provided with a collar 60 adapted to coact with the top portion of the guide member 54 and limit the downward movement of the stem 59. The weight 61 urges the stem 59 downward and tends to maintain the switch 56 in the open position. The weight 61 carries a laterally projecting pin 62 which overlies the lever 46 whereby a predetermined upward movement of lever 46 will raise stem 59 and engage the bridging member 58 with the stationary contacts 57 thereby closing switch 56.

The circuit for energizing the blower motor B is connected to a source of power, lines 63, 65, and comprises line wire 63, wire 64, a transformer 66 including primary windings 67, 68 connected in parallel by wires 69, 71 and 72, 73 respectively, wire 74, wire 76, contacts 57, bridging member 58 of switch 56, wire 77, contact 78, bridging member 79 of switch 81 and wire 82 to the line wire 65. The transformer 66 includes secondary windings 83, 84 connected in bucking relation by a wire 86. Winding 84 includes a plurality of taps 87 and a manually actuated bridging member 88 operable to engage a selected one of said taps for varying the active portion of the winding 84 which is to be connected in bucking relation with the winding 83. The blower motor B is connected in circuit with said secondary windings 83, 84 of transformer 66 by means of the bridging member 88, wire 89, wire 91, the bridging member 92 of a solenoid actuated switch 93 and, depending upon the position of the bridging member 92 with respect to contacts L, H, either by a wire 94 with the windings 83, 84 connected in bucking relation or by a wire 96 and wire 86 with the active portion of winding 84. The circuit for energizing the valve or circulating pump motor C comprises line wire 63, wire 97, manual switch 98, wire 99, motor C, wire 101, contacts 102, bridging member 103 of the solenoid actuated switch 104, wire 106, wire 107, wire 76, contacts 57, bridging member 58 of switch 56, wire 77, contact 78, bridging member 79 of switch 81, and wire 82 to line wire 65. An energizing circuit for motor 37 comprises line wire 63, wire 108, motor 37, wire 109, contact 111, bimetallic element 112 of microswitch 113, wire 114, contact 78, bridging member 79 of switch 81, and wire 82 to line wire 65. Another energizing circuit for motor 37 comprises line wire 63, wire 108, motor 37, wire 116, wire 117, contact 118, bimetallic element 112 of microswitch 113, wire 114, contact 78, bridging member 79 of switch 81 and wire 82 to line wire 65. Still another circuit for energizing motor 37 comprises wire 108 connected with one side of line 63, motor 37, wire 116, wire 119, contact 121, bridging member 79 of switch 81 and wire 82 to line wire 65. The solenoid 122 of switch 93, is energized by a circuit comprising line wire 63, wire 123, solenoid 122, wire 124, wire 126, contact 127, bimetallic element 112 of microswitch 113, wire 114, contact 78, bridging member 79 of switch 81 and wire 82 to line wire 65. A second energizing circuit for the solenoid 122 comprises line wire 63, wire 123, solenoid 122, wire 124, wire 128, contact 129, bridging member 79 of switch 81 and wire 82 to line wire 65. The solenoid 131 of switch 104 is energized by a circuit comprising line wire 63, wire 64, primary windings 67, 68 connected in parallel by wires 69, 71 and 72, 73 respectively, wire 74, wire 107, wire 132, solenoid 131, wire 133, contact 129, bridging member 79 of switch 81 and wire 82 to line wire 65.

The bimetallic element 112 of microswitch 113 engages contact 118 whenever the temperature of the space to be heated is more than a predetermined value, and when the temperature of the space decreases to a value only slightly below the said predetermined value, the bimetallic element quickly moves to the right and engages contact 111 as illustrated by the dotted line position shown in Fig. 1. A further decrease in the temperature of the space below the said predetermined value causes the bimetallic element to deflect and engage contact 127. The manually operated summer-winter switch 81 includes a bridging member 79, a single winter contact 78 and a pair of summer contacts 121, 129. Whenever the system is operated to deliver heat to a space to be heated, bridging member 79 is positioned to engage contact 78 and whenever the supply of heating fluid is cut off from the radiator 2 and a cooling fluid is passed therethrough, the bridging member 79 is moved to the right and into engagement with contacts 121, 129. If it is desired to completely shut down the system, the bridging member 79 is moved to the off position and out of engagement with the contacts 78, 121 and 129. The previously described lever arrangement is such that when the temperature of the fluid in the casing 33 exceeds a predetermined maximum value, upward movement of lever 39 causes lever 46 to engage the projecting pin 62 and effect a closure of switch 56 irrespective of the position of the crank arm 52 of motor 37. This arrangement results in an operation of the blower B and delivery of the heating medium to the space to be heated irrespective of the demands for heat therein and prevents overheating of the heater and damage to the various parts thereof. The supply of heating medium to the space to be heated when there is no demand for heat, will of course warn the occupants of such space that something is wrong with the heating unit and that the heater should be given immediate attention.

The operation of the previously described control system, assuming that the system is to be operated to supply heating medium to the space to be heated in accordance with the demand therein, is as follows. The bridging member 79 of switch 81 is moved into engagement with contact 78 and if the temperature of the space to be heated is more than the desired value for which the microswitch 113 is set to operate, the bimetallic element 112 will be in engagement with contact 118 as indicated by its full line position shown in Fig. 1. Motor 37 will be energized to move the crank arm 52 to the position shown in the drawing, and if the temperature of the fluid in the heater is less than the aforementioned maximum limit, switch 56 will be open and the circulating pump and blower motors inoperative. However, if the space temperature decreases below the predetermined value, the bimetallic element 112 of microswitch 113 moves to the right and engages contact 111 thereby energizing motor 37 to rotate crank arm 52 180° from the position shown. This operation moves lever 46 in a counterclockwise direction about its point of pivotal connection 47 with lever 39 and, if the temperature of the fluid in the heater is above a predetermined minimum value, into engagement with the projecting pin 62 on switch weight 61, thereby effecting a closure of switch 56. The closure of switch 56 energizes parallel circuits including the transformer 66 and the circulating pump motor C, thereby effecting a simultaneous operation of the blower and pump. The solenoid 122 of switch 93 is not energized, and as a result the bridging member 92 is in the position shown which connects the secondary winding 83 and the active portion of secondary winding 84 in bucking relation and the blower operates at the predetermined low rate. This mode of operation continues until the space temperature either increases and causes the bimetallic element 112 to engage contact 118 and terminate operation of the blower and circulating pump or further decreases and causes the bimetallic element 112 to flex and engage contact 127. The engagement of bimetallic element 112 with contact 127 closes the energizing circuit for the solenoid 122 of switch 93 and moves the bridging member 92 from engagement with contact L and into engagement with contact H, which renders secondary winding 83 inoperative and connects the blower across the active portion of secondary winding 84, thereby effecting an operation of the blower at the higher speed. The operation of the blower at the higher speed continues until the temperature of the space increases sufficiently to cause the bimetallic element 112 to move out of engagement with contact 127 which deenergizes the circuit including the solenoid 122. Consequently, bridging member 92 reengages contact L and continues operation of blower motor B at the lower rate. If the supply of heating medium at the low rate is sufficient to effect a further increase in the temperature, the bimetallic element 112 moves from engagement with contact 111 and into engagement with contact 118, thereby energizing motor 37 and effecting a rotation of the motor crank arm 52 through 180° and into the position shown which lowers lever 46 and permits weight 61 to open switch 56, thereby terminating operation of the blower and the circulating pump. It is of course essential that the temperature of the fluid in the heater 1 and radiator 2 be within the predetermined limits in order to permit the system to operate in the manner previously described as it is obvious that if the fluid temperature is below the said predetermined minimum value, the adjustable fulcrum (connection 47) for lever 46 will be lowered by a counterclockwise movement of counterweighted lever 39 and as a result energization of motor 37 and rotation of crank arm 52 180° from the position shown will not operate to cause lever 46 to engage projecting pin 62 and close switch 56.

When it is desired to operate the blower to supply cool air to the space to be heated, valves 16, 17 are closed and valve 21 and cock 22 are opened to pass cooled water through the radiator 2 and the bridging member 79 of summer-winter switch 81 is moved into engagement with contacts 121, 129. The engagement of bridging member 79 with contact 121 energizes motor 37 to position the crank arm 52 in the position shown and maintain it in such position irrespective of the temperature of the space to be heated. Engagement of bridging member 79 with contact 129 energizes parallel circuits, one of which includes solenoid 131 of switch 104 and the primary windings 67, 68 of transformer 66 and the other of which includes solenoid 122 of switch 93. Energization of solenoid 131 operates switch 104, thereby preventing operation of motor driven circulating pump C and energization of solenoid 122 of switch 93 moves the bridging member 92 from engagement with contact L and into engagement with contact H, thereby effecting an operation of the blower motor B at a high rate determined by the position of the manually adjustable bridging member 88. The engagement of contacts 121, 129 by bridging member 79 of switch 81 renders the microswitch 113 inoperative to control energization of motor 37, the position of lever 46, and energization of solenoid 122 of switch 93 irrespective of temperature conditions. Maintaining lever 46 in the position shown places the heater draft control under the sole control of the regulating lever 39 so that the heater may be continued in operation for heating tap water by any suitable arrangement which may be similar to that disclosed by Drewry Patent No. 2,129,202.

The invention contemplates a construction operable to effect a delivery or an accelerated delivery of the heating medium at a plurality of different rates, including a high rate which exceeds the rate of heat dissipation from the space to be heated and a low rate which is preferably approximately equal to or only slightly less than the rate of heat dissipation and to vary the rate of delivery of the heating medium inversely with respect to changes in the temperature of the said space. When a construction operable to effect a delivery of the heating medium at only two rates is employed, the best results are obtained if delivery rates conforming with the above specified high and low rates are selected and if the operation is such that the heating medium is delivered at the low rate whenever the space temperature reaches a value approximately equal to or slightly below the desired value and the low rate of delivery is continued until the space temperature either increases and slightly exceeds the desired value at which time the delivery should be terminated or decreases to an appreciable degree below the desired value at which time the delivery should be effected at the high rate and continued at the high rate until the space temperature again approaches the desired value. However, satisfactory results have been obtained using a low delivery rate which is consideragly less than the rate of heat dissipation and which necessitates continuous operation of the heating medium delivery means, and the invention also contemplates a construction operable in this manner. In addition, the invention contemplates a construction embodying a delivery means which is rendered operable by the manipulation of a single control member to effect either a delivery or an accelerated delivery of a heating medium at a plurality of different rates, or a delivery of a cooling medium at a high rate.

The disclosure illustrates a particular application of the invention, and it should be understood that it is not desired to limit the invention to the details of construction and operation herein shown and described as modifications within the scope of the claims may occur to persons skilled in the art.

It is claimed and desired to secure by Letters Patent:

1. A space temperature control system combination comprising means for effecting a forced delivery of a heated or cooled medium to a space which is to be heated or cooled, means for heating said medium including a heat generator, means for cooling said medium while operating said heat generator, means for varying the rate of heat generation including a movable member, a space temperature responsive device, a heat generator responsive device, connections rendering said space temperature and heat generator responsive devices jointly and severally operable to vary the position of said movable member and to control the operation of said forced delivery means, said space temperature device being operative whenever the temperature of the heat generator is within predetermined limits and in response to predetermined variations in space temperature to control the operation of the forced delivery means, a summer-winter control operatively associated with said force delivery means and with said connections, said control being operative when in its winter position to render said space and heat generator responsive devices jointly and severally operable to vary the position of said movable member and said space temperature device effective to control the operation of the forced delivery means, and said control being operative when in its summer position to render said space temperature device inoperative to vary the position of said movable member, to effect a continuous operation of said forced delivery means, and to render said heat generator responsive device operative to vary the position of said movable member and thereby the rate of heat generation.

2. A space temperature control system combination comprising means for effecting a forced delivery of a heated or cooled medium to a space which is to be heated or cooled, means for heating said medium including a heat generator, means for cooling said medium while operating said heat generator, means for varying the rate of heat generation including a movable member, means responsive to the position of said member controlling operation of the forced delivery means, a space temperature responsive device, a heat generator responsive device, connections rendering said space temperature and heat generator responsive devices jointly and severally operable to vary the position of said movable member, said space temperature device being operative whenever the temperature of the heat generator is within predetermined limits and in response to predetermined variations in space temperature to effect a movement of said member sufficient to control the operation of the forced delivery means, a summer-winter control operatively associated with said forced delivery means and with said connections, said control being operative when in its winter position to render said space and heat generator responsive devices jointly and severally operable to vary the position of said movable member and said space temperature device effective to control the operation of the forced delivery means, and said control being operative when in its summer position to render said space temperature device inoperative to vary the position of said movable member, to effect a continuous operation of said forced delevery means, and to render said heat generator responsive device operative to vary the position of said movable member and thereby the rate of heat generation without affecting the operation of the said forced delivery means.

3. A space temperature control system combination comprising means for effecting a forced delivery of a heated or cooled medium to a space which is to be heated or cooled, regulating means for operating said forced delivery means at different rates, means for heating said medium including a heat generator, means for cooling said medium while operating said heat generator, means for varying the rate of heat generation including a movable member, means responsive to the position of said movable member controlling the operation of the forced delivery means, a space temperature responsive device, a heat generator responsive device, connections rendering said space and heat generator responsive devices jointly and severally operable to vary the position of said movable member, said space temperature responsive device being effective when the temperature of the heat generator is within predetermined limits and the space temperature is within a predetermined range to cause the forced delivery means to operate at a relatively high rate, and effective when the temperature of the heat generator is within said predetermined limits and the space temperature is within a predetermined higher range to cause the forced delivery means to operate at a relatively low rate, a summer-winter control operatively associated with said regulating means and with said connections, said control being operative when in its winter position to render said space and heat generator temperature responsive devices jointly and severally operable to vary the position of said movable member and said space temperature responsive devices effective to control the operation of the forced delivery means at different rates, and said control being operative when in its summer position to render said space temperature responsive device inoperative to vary the position of said movable member, to effect operation of the said forced delivery means at the said relatively high rate irrespective of space and heat generator temperatures, and to render said heat generator responsive device operative to vary the position of said movable member and thereby the rate of heat generation without affecting the operation of the said forced delivery means.

4. A space temperature control system combination comprising means for effecting a forced delivery of a heated or cooled medium to a space which is to be heated or cooled, regulating means for operating said forced delivery means at different rates, means for heating said medium including a heat generator, means for cooling said medium while operating said heat generator, means for varying the rate of heat generation including a movable member, means responsive to the position of said movable member controlling the operation of the forced delivery means, a space temperature responsive device, a heat generator responsive device, connections rendering said space and heat generator responsive devices jointly and severally operable to vary the position of said movable member, said space temperature device being effective when the temperature of the heat generator is within predetermined limits and in response to predetermined variations in space temperature to effect a movement of said member sufficient to control the operation of the forced delivery means, a summer-winter control operatively associated with said regulating means and with said connections, said control being operative when in its winter position to render said space and heat generator temperature responsive devices jointly and severally operable to vary the position of said movable member and said space temperature device effective to control the operation of the forced delivery means, and said control being operative when in its summer position to render said space temperature device inoperative to vary the position of said movable member, to cause said forced delivery means to operate at a relatively high rate, and to render said heat generator responsive device operative to vary the position of said movable member and thereby the rate of heat generation without affecting the operation of the said forced delivery means.

5. A space temperature control system combination comprising means for effecting a forced delivery of a heated or cooled medium to a space which is to be heated or cooled, regulating means for effecting a forced delivery of the heated or cooled medium at different rates, means for heating said medium including a heat generator, means for cooling said medium while operating said heat generator, a heat generator responsive device, a space temperature responsive device, means for varying the rate of heat generation including a lever floatingly connected with said heat generator and space temperature responsive devices and rendering said devices jointly and severally operable to vary the rate of heat generation, means responsive to the position of said lever controlling the forced delivery of the medium to said space, connections rendering the space temperature responsive device operative whenever the temperature of the heat generator is within predetermined limits and the space temperature is within a predetermined range to effect a forced delivery of the heated medium at a relatively high rate and operative whenever the temperature of the heat generator is within said predetermined limits and the space temperature is within a predetermined higher range to effect a forced delivery of the heated medium at a relatively low rate, a summer-winter control operatively associated with said regulating means and with said means including the space temperature responsive device, said control being operative when in its winter position to render the means including the space temperature responsive device effective to move said lever to thereby vary the rate of heat generation and to control the forced delivery of the heated medium, and said control being operative when in its summer position to effect a forced delivery of the cooled medium at a relatively high rate and to render said means including the space temperature responsive device inoperative to effect a movement of said lever in response to variations in space temperature.

6. A space temperature control system combination comprising means for effecting a forced delivery of a heated or cooled medium to a space which is to be heated or cooled, regulating means for operating said forced delivery means at different rates, means for heating said medium including a heat generator, means for cooling said medium while operating said heat generator, means for varying the rate of heat generation including a movable member, a space temperature responsive device, a heat generator responsive device, means operatively connecting said means for varying the rate of heat generation, said regulating means and said space temperature and heat generator responsive devices and rendering said space temperature and heat generator responsive devices jointly and severally operable to vary the position of said movable member and thereby the rate of heat generation, said space temperature responsive device being effective whenever the temperature of the heat generator is within predetermined limits and the space temperature is within a predetermined range to cause the forced delivery means to operate at a relatively high rate and effective whenever the temperature of the heat generator is within said predetermined limits and the space temperature is within a predetermined higher range to cause the forced delivery means to operate at a relatively low rate, a summer-winter control operatively associated with said regulating means and with said connecting means, said control being effective when in its winter position to render said space temperature and heat generator responsive devices jointly and severally operable to vary the position of said movable member and said space temperature responsive device operable to control the operation of the forced delivery means at different rates, and said control being effective when in its summer position to cause said forced delivery means to operate at the said relatively high rate irrespective of space temperature variations and to render said space temperature responsive device inoperative to vary the position of said movable member.

7. A space temperature control system combination comprising means for effecting a forced delivery of a heated or cooled medium to a space which is to be heated or cooled, regulating means for operating the forced delivery means at different rates, means for heating said medium including a heat generator, means for cooling said medium while operating said heat generator, means for varying the rate of heat generation including a lever pivotally mounted on an adjustable fulcrum, a heat generator responsive device operative to adjust the position of said fulcrum, means including a space temperature responsive device operatively associated with an end of said lever for effecting a pivotal movement of the said lever with respect to said fulcrum, means responsive to the position of said lever controlling operation of the forced delivery means, connections rendering the space temperature responsive device effective whenever the temperature of the heat generator is within predetermined limits and the space temperature is within a predetermined range to cause the forced delivery means to operate at a relatively high delivery rate and effective whenever the temperature of the heat generator is within said predetermined limits and the space temperature is within a predetermined higher range to cause the forced delivery means to operate at a relatively low rate, a summer-winter control operatively associated with said forced delivery operating means, with said regulating means and with said means including the space temperature responsive device, said control being effective when in its winter position to render the means including the space temperature responsive device operative to pivotally move said lever about the said fulcrum to thereby vary the rate of heat generation and to control the operation of the forced delivery means, and said control being effective when in its summer position to cause the end of said lever with which said means including the space temperature device is associated to be moved to and maintained in a predetermined position with respect to said fulcrum, to render said means including the space temperature responsive device inoperative to vary the position of said lever, and to cause said forced delivery means to operate at the said relatively high rate.

OLIVER L. PARSONS.

CERTIFICATE OF CORRECTION.

Patent No. 2,267,165. December 23, 1941.

OLIVER L. PARSONS.

It is hereby certified that error appears in the printed specification of the above numbered patent requiring correction as follows: Page 5, second column, line 1, claim 1, for "force" read --forced--; line 51, claim 2, for "delevery" read --delivery--; page 6, first column, line 15, claim 3, for "devices" read --device--; and that the said Letters Patent should be read with this correction therein that the same may conform to the record of the case in the Patent Office.

Signed and sealed this 10th day of February, A. D. 1942.

(Seal)

Henry Van Arsdale,
Acting Commissioner of Patents.